United States Patent
Limonad et al.

(10) Patent No.: US 9,858,641 B2
(45) Date of Patent: Jan. 2, 2018

(54) REPRESENTING A SYSTEM USING VIEWPOINTS

(71) Applicant: International Business Machines Corporation, Armonk, NY (US)

(72) Inventors: Lior Limonad, Nesher (IL); Michael Masin, Haifa (IL); Aviad Sela, Yokneam (IL); Yishai A Feldman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 14/569,800

(22) Filed: Dec. 15, 2014

(65) Prior Publication Data

US 2016/0171367 A1 Jun. 16, 2016

(51) Int. Cl.
G06F 9/44 (2006.01)
G06T 3/20 (2006.01)
G06N 5/02 (2006.01)
G06Q 10/06 (2012.01)

(52) U.S. Cl.
CPC .............. G06T 3/20 (2013.01); G06N 5/022 (2013.01); *G06Q 10/06* (2013.01)

(58) Field of Classification Search
CPC ........... G06Q 10/06; G06T 3/20; G06N 5/022
See application file for complete search history.

(56) References Cited

U.S. PATENT DOCUMENTS

| | | | | |
|---|---|---|---|---|
| 7,228,306 B1* | 6/2007 | Altman | .............. | G06F 17/30067 |
| 9,569,725 B2* | 2/2017 | B'Far | .................... | G06N 5/022 |
| 9,684,947 B2* | 6/2017 | Bailiang | .................... | G06T 3/20 |
| 2004/0133290 A1* | 7/2004 | Noble | ..................... | G06Q 10/06 700/90 |
| 2004/0193561 A1* | 9/2004 | Ohashi | ................... | G06N 5/022 706/46 |
| 2006/0224630 A1* | 10/2006 | Balmelli | ................ | G06Q 10/00 |
| 2006/0242097 A1* | 10/2006 | Gu | ......................... | G06N 5/022 706/45 |
| 2007/0061354 A1* | 3/2007 | Sarkar | .................... | G06Q 10/06 |

(Continued)

OTHER PUBLICATIONS

Erik Herzog et al., "SysML—an Assessment", [Online], 2005, pp. 1-13, [Retrieved from Internet on May 10, 2016], <http://citeseerx.ist.psu.edu/viewdoc/download?doi=10.1.1.92.5540&rep=rep1&type=pdf>.*

(Continued)

*Primary Examiner* — Ziaul A Chowdhury
(74) *Attorney, Agent, or Firm* — Ziv Glazberg (57) ABSTRACT

A method comprising: obtaining a first viewpoint representing a partial depiction of a system, wherein the first viewpoint comprises a property base, an instance base and a class base; obtaining a second viewpoint representing a partial depiction of the system, wherein the second viewpoint comprises a property base, an instance base and a class base, wherein the instance base of the second viewpoint is different than the instance base of the first viewpoint; creating a third viewpoint based on the first and second viewpoints, wherein the third viewpoint representing the system, wherein the third viewpoint comprises a property base, an instance base and a class base, wherein the instance base comprises instances defined by the instance base of the first viewpoint and instances defined by the instance base of the second viewpoint.

15 Claims, 4 Drawing Sheets

(56) References Cited

U.S. PATENT DOCUMENTS

| | | | | |
|---|---|---|---|---|
| 2007/0240183 | A1* | 10/2007 | Garbow | H04N 7/163 725/38 |
| 2009/0043802 | A1* | 2/2009 | Appel | G06Q 10/06 |
| 2012/0158386 | A1* | 6/2012 | Ehben | G06F 8/10 703/6 |
| 2012/0226967 | A1 | 9/2012 | Oh et al. | |
| 2013/0179857 | A1* | 7/2013 | Jalaldeen | G06F 8/10 717/104 |
| 2014/0201706 | A1* | 7/2014 | Boaz | G06F 8/10 717/104 |
| 2015/0105961 | A1* | 4/2015 | Callow | G06F 8/35 701/23 |
| 2015/0109345 | A1* | 4/2015 | Song | G06T 3/20 345/672 |
| 2015/0178887 | A1* | 6/2015 | Kim | G06T 3/20 345/672 |
| 2016/0321576 | A1* | 11/2016 | Whittington | G06Q 10/06 |
| 2016/0364837 | A1* | 12/2016 | Aoyama | G06T 3/20 |

OTHER PUBLICATIONS

Dragan Djurić et al., "Ontology Modeling and MDA", [Online], Publication 2005, pp. 109-128, [Retrieved from Internet on May 15, 2016], <http://citeseerx.ist.psu.edu/viewdoc/download?doi=10.1.1.80.6159&rep=rep1&type=pdf>.*

Klaus Fischer et al. "Viewpoint-Based Modeling-Towards Defining the Viewpoint Concept and Implications for Supporting Modeling Tools", [Online], 2012, pp. 123-136, [Retrieved from Internet on May 16, 2015], <http://cs.emis.de/LNI/Proceedings/Proceedings206/123.pdf>.*

Francois Christophe et al., "OPAS: Ontology Processing for Assisted Synthesis of Conceptual Design Solutions", [Online], 2009, pp. 1-12, [Retrieved from Internet on Aug. 21, 2017], <http://proceedings.asmedigitalcollection.asme.org/proceeding.aspx?articleid=1649934>.*

Antonio Vallecillo, "On the Combination of Domain Specific Modeling Languages", [Online], 2010, pp. 305-320, [Retrieved from Interent on Aug. 21, 2017], <https://pdfs.semanticscholar.org/2cb3/af0ac1ac84ee60183fa2a9f9b64db7dab308.pdf>.*

Charles Andre et al., "Multiform Time in UML for Real-time Embedded Applications", [Online], 2007, pp. 1-6, [Retrived from Internet on Aug. 21, 2017], <https://hal.archives-ouvertes.fr/file/index/docid/204503/filename/rtcsa07.pdf>.*

M'hamed Rahmouni et al., "Model-Driven Generation: From Models to MVC2 Web Applications", [Online], 2014, pp. 73-94, [Retrieved from Internet on Aug. 21, 2017], <https://www.researchgate.net/profile/Samir_Mbarki/publication/267333010_Model-Driven_Generation_From_Models_to_MVC2_Web_Applications/links/544c14cd0cf2d6347f43a3e3.pdf>.*

Stefan Wölkl et al., "A Computational Product Model for Conceptual Design Using SYSML", ASME, Proceedings of the ASME 2009 International Design Engineering Technical Conferences & Computers and Information in Engineering Conference IDETC/CIE 2009, pp. 1-11.

Yue Cao et al., "Sysml-Based Uniform Behavior Modeling and Automated Mapping of Design and Simulation Model for Complex Mechatronics", Elsevier, Computer-Aided Design, vol. 45, Issue 3, Mar. 2013, pp. 764-776.

* cited by examiner

REPRESENTING A SYSTEM USING VIEWPOINTS

TECHNICAL FIELD

The present disclosure relates to system engineering in general, and to model-based system engineering, in particular.

BACKGROUND

Systems engineering is a field of engineering that focuses on how to design and manage complex engineering systems over their life cycles. Systems engineering deals with the systematic planning, design, and construction of highly complex, large-scale systems. Systems engineering ensures that all likely aspects of a project or system are considered, and integrated into a whole.

The need for systems engineering arose with the increase in complexity of systems and projects, in turn exponentially increasing the possibility of component friction, and therefore the unreliability of the design. When speaking in this context, complexity incorporates not only engineering systems, but also the logical human organization of data. At the same time, a system can become more complex due to an increase in size as well as with an increase in the amount of data, variables, or the number of fields that are involved in the design.

Despite the enormous effort put forth by system engineers to find the most promising design, inferior or partially infeasible designs may still be designed in complex systems. A Model-Based System Engineering (MBSE) approach is typically employed to mitigate such consequences and allow adequate coverage of the design-space. MBSE is the formalized application of modeling to support system requirements, design, analysis, verification and validation activities beginning in the conceptual design phase and continuing throughout development and later life cycle phases.

BRIEF SUMMARY

One exemplary embodiment of the disclosed subject matter is a method comprising: obtaining a first viewpoint representing a partial depiction of a system, wherein the first viewpoint comprises a property base, an instance base and a class base; obtaining a second viewpoint representing a partial depiction of the system, wherein the second viewpoint comprises a property base, an instance base and a class base, wherein the instance base of the second viewpoint is different than the instance base of the first viewpoint; creating a third viewpoint based on the first and second viewpoints, wherein the third viewpoint representing the system, wherein the third viewpoint comprises a property base, an instance base and a class base, wherein the instance base comprises instances defined by the instance base of the first viewpoint and instances defined by the instance base of the second viewpoint.

Another exemplary embodiment of the disclosed subject matter is a computerized apparatus having a processor, the processor being adapted to perform the steps of: obtaining a first viewpoint representing a partial depiction of a system, wherein the first viewpoint comprises a property base, an instance base and a class base; obtaining a second viewpoint representing a partial depiction of the system, wherein the second viewpoint comprises a property base, an instance base and a class base, wherein the instance base of the second viewpoint is different than the instance base of the first viewpoint; creating a third viewpoint based on the first and second viewpoints, wherein the third viewpoint representing the system, wherein the third viewpoint comprises a property base, an instance base and a class base, wherein the instance base comprises instances defined by the instance base of the first viewpoint and instances defined by the instance base of the second viewpoint.

Yet another exemplary embodiment of the disclosed subject matter is a computer program product comprising a computer readable storage medium retaining program instructions, which program instructions when read by a processor, cause the processor to perform a method comprising: obtaining a first viewpoint representing a partial depiction of a system, wherein the first viewpoint comprises a property base, an instance base and a class base; obtaining a second viewpoint representing a partial depiction of the system, wherein the second viewpoint comprises a property base, an instance base and a class base, wherein the instance base of the second viewpoint is different than the instance base of the first viewpoint; creating a third viewpoint based on the first and second viewpoints, wherein the third viewpoint representing the system, wherein the third viewpoint comprises a property base, an instance base and a class base, wherein the instance base comprises instances defined by the instance base of the first viewpoint and instances defined by the instance base of the second viewpoint.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to develop a cross-tool integration between different models of a same system. In some cases, tools from multiple vendors of the system may be made to inter-operate and be used to model a same system, each tool being used to model different aspects or parts of the system. The different parts or aspects may be overlapping and a modification in one tool may affect a model as described by a second tool.

A system may be a set of interacting or interdependent components forming an integrated whole. The system may be a set of elements and relationships and may be modeled accordingly. Different systems may be modeled using different sets of elements and relationships. Every system may be delineated by spatial and temporal boundaries, surrounded and influenced by its environment, described by its structure and purpose and expressed in its functioning. The system may have a structure. The structure may contain parts that may be directly or indirectly related to each other. Different systems may have different structures. The system may also have a behavior. The behavior may exhibit processes that fulfill the system's function or purpose. In some exemplary embodiments, different parts of the system may be connected by structural relationships. Additionally or alternatively, the different parts of the system may be connected by behavioral relationships. As non limiting examples, the system may be a hardware device with inter-connected components, a software-implemented system, or the like.

One technical solution is to represent the system by a set of interrelated viewpoints. Each such viewpoint may a partial depiction of the holistic design of the system. Additionally or alternatively, each viewpoint may be considered to impose a domain-specific ontology of the system. In some exemplary embodiments, any number of viewpoints may be used. Different viewpoints may conceptually relate to one another in various correspondence schemes, such as generalization vs. specialization, composites vs. constituents, requirements vs. realizations, different life-cycle stages, or any other conceptually meaningful mappings.

In some exemplary embodiments, a viewpoint may comprise a property base, an instance base and a class base. The property base may define the properties which the viewpoint refers to. The instance base may define instances which the viewpoint refers to and optionally assign properties to the instances. The class base may define classes that the viewpoint refers to. Optionally, an instance may be assigned to a class base on the properties that are assigned to the instance.

In some exemplary embodiments, an aggregated viewpoint may be created based on two or more viewpoints. The aggregated viewpoint may include information that is obtained from a first partial depiction of the system as specified in one viewpoint and from a second partial depiction of the system as specified in another viewpoint.

Viewpoints may be specified independently by different parties, using different tools and modeling languages (e.g., Unified Modeling Language (UML), SysML, Modelica).

In some exemplary embodiments, there may also be a need to maintain and synchronize subsets of independent analysis and design specifications. In some exemplary embodiments, viewpoint specification may follow an iterative and accumulative scheme, in which viewpoint elements may be constantly modified, added, and dropped. A modification in one tool or in one partial view of the system may be propagated to be reflected in other tools or partial views of the system.

In some exemplary embodiments, each viewpoint may be specified by properties, instances and classes. A property may be a type of proposition that is true with respect to its possessing instance or class (i.e., a set of instances). For example, "is blue", "age is 30", "has weight", "is married", "can lift", or the like. In some exemplary embodiments, a viewpoint may enable the specification of its own properties. Additionally or alternatively, property specifications may also be imported from other viewpoints. An instance specified in a viewpoint may correspond to the embodiment of some individual element in the system. The specification of instances may be independent of any particular classification and may be either explicit in a viewpoint, or imported from other viewpoints. Instances may be specified as a combination of instances specified in other viewpoints. Any concrete form of some algebra over sets language may be employed for such a purpose. A class may be a set of grouped instances having certain properties in common. In some exemplary embodiments, instances may be grouped together based on shared properties. A viewpoint may enable the specification of its own classes. Class specification may also be imported from other viewpoints.

In a property-based platform, the specification of either an instance or a class may be provided by associating each with its particular properties. There may be different relationship types between the various properties specified in a viewpoint. A framework in accordance with the disclosed subject matter may enable the specification of various property relationship types. As an example, a property relationship may be "if $p_1$ holds, then $p_2$ holds.", where $p_1$ and $p_2$ reflect some properties. This kind of inference may be termed precedence. Property relationships may be explicitly defined for a viewpoint, implicitly defined based on other viewpoints (e.g., imported from other viewpoints), or the like.

Another technical solution may be to intercept queries from a tool to its knowledge base and respond to the queries based on an aggregated knowledge base. The aggregated knowledge base may be a representation of an aggregated viewpoint which may import properties, instances, or classes that are specified in some other viewpoints. It may be noted that that the aggregated viewpoint is a regular viewpoint, and every viewpoint may be an aggregated viewpoint, i.e. every viewpoint in the accordance with the disclosed subject matter may import properties, instances, or classes that are specified in some other viewpoints.

In some exemplary embodiments, an update query (e.g. modification of an instance, deletion of an instance, creation of an instance, or the like) to the knowledge base may be intercepted and provided to a middleware. The middleware may obtain the intercepted query, update a viewpoint of the querying tool according to the update query. The middleware may update an aggregated viewpoint according to the updated viewpoint of the querying tool so as to reflect the update in the aggregated viewpoint.

In some exemplary embodiments, a retrieval query (e.g., select all instances that comply with some condition) may be intercepted. The middleware may then perform the query against the aggregated viewpoint to provide a response that is not limited to modifications made by the querying tool. The results of the query may be provided back to the tool as a response which may appear to the tool as emanating from the knowledge base.

In some exemplary embodiments, queries may be provided by a query language, such as SQL. The query may be evaluated against a viewpoint. The query may relate to properties or classes defined in the viewpoint.

In some exemplary embodiments, the middleware may intercept the query before reaching the knowledge base. In some exemplary embodiments, an update query may be intercepted and allowed to be processed by the tool's knowledge base. The update query may also be handled by the aggregated viewpoint and its effects may be propagated to all knowledge bases of the other affected tools. In case of a retrieval query, the query may be processed by the tool's knowledge base directly as the aggregated effects may be designed to be reflected in the knowledge base immediately after the relevant update queries.

Figure 1:
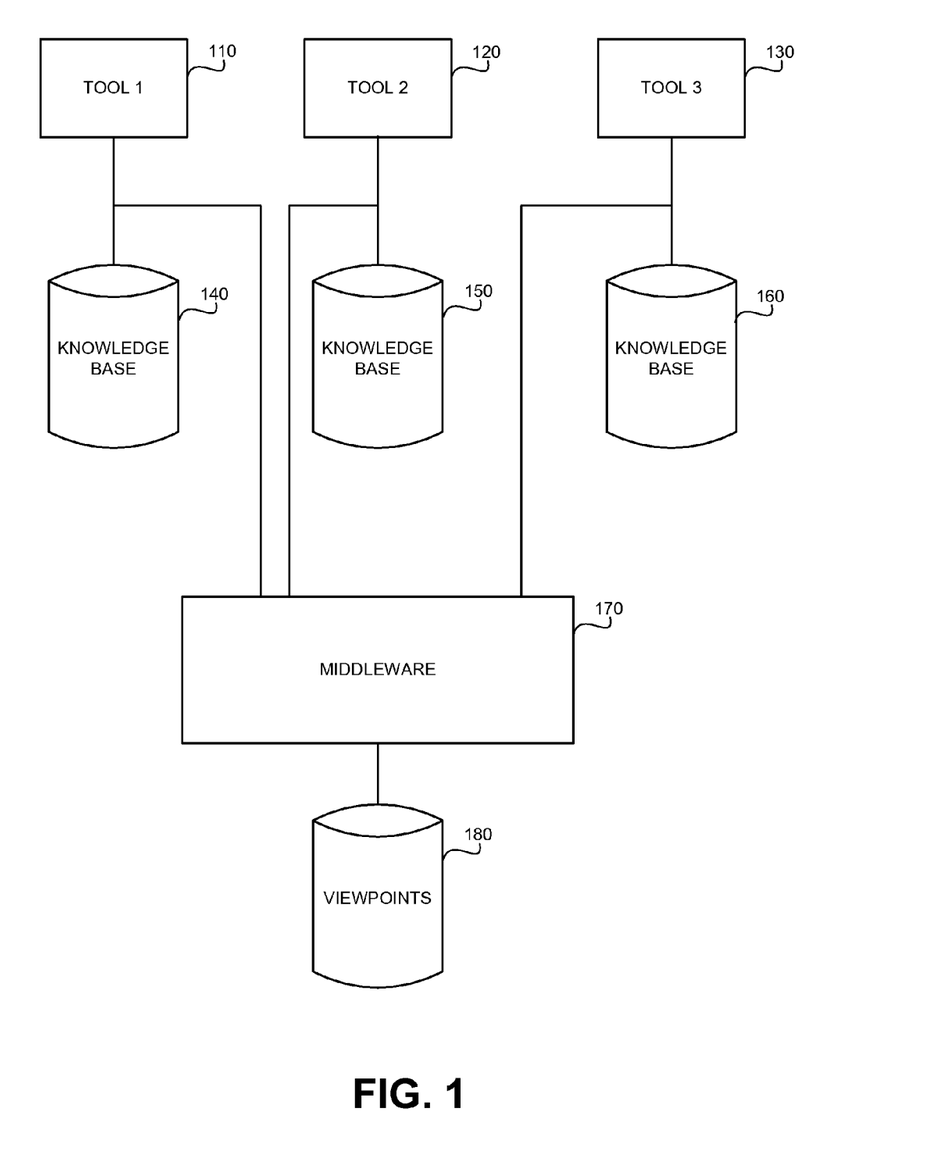
FIG. 1 shows a computerized environment in which the disclosed subject matter is used, in accordance with some exemplary embodiments of the subject matter.

Referring now to FIG. 1 showing a computerized environment in which the disclosed subject matter is used, in accordance with some exemplary embodiments of the subject matter.

In some exemplary embodiments, the computerized environment may comprise multiple designing tools.

Tool 1 110 may be a designing tool, which may be used to provide a first depiction of a target system (not shown).

Tool 1 110 may utilize Knowledge Base 140 to retain information such as modelled elements, instances and properties, inter-dependency between elements, actions, or the like. Knowledge Base 140 may be a database, a data store, or the like. In some cases, Knowledge Base 140 may be implemented using a DataBase Management System (DBMS) and may be responsive to queries, such as update queries, select queries, or the like.

Similarly, Tool 2 120 and Tool 3 130, may be designing tools which may be used to provide additional or alternative depiction of the target system. Tool 2 120 and Tool 3 130 may use Knowledge Base 150 and Knowledge Base 160, respectively.

In some exemplary embodiments, Tool 1 110, Tool 2 120 and Tool 3 130 may be independent designing tools. In some cases, the tools may not be configured to interact with one another and they may be oblivious to one another. The tools may be off-the-shelf tools which may use any format which may or may not be compatible with one another. Additionally or alternatively, the tools may not be configured to influence one another so that if Tool 1 110 modifies an element of the target system, Tool 1 110 may not update Tool 2 120 or Tool 3 130 to reflect such modification in their depiction of the target system. It will be noted that FIG. 1 is exemplary only and the disclosed subject may be utilized in any environment in which there is more than one tool.

In some exemplary embodiments, based on the knowledge base of each tool, a viewpoint may be created. Each viewpoint may represent a partial depiction of the target system. In some exemplary embodiments, the target system may be a group of related hardware units, a group of software programs or a combination between the two groups. In some exemplary embodiments, the groups may be dedicated to a single application. Each designing tool may relate to a different requirement of the target system, a different aspect thereof. In some exemplary embodiments, different diagrams may be used in different tools, such as but not limited to use case diagram, sequence diagram, activity diagram, class diagram, component diagram, or the like.

In some exemplary embodiments, a Middleware 170 may be a computerized device, such as implemented in software, hardware, combination thereof or the like, which may be configured to obtain viewpoints associated with Tools 110, 120, 130 and provide a holistic view of the target system. In some exemplary embodiments, Tools 110, 120, 130 may or may not be aware of the existence of Middleware 170. In one embodiment, a tool, such as 110, may be configured to utilize an Application Programming Interface (API) of Middleware 170 to provide Middleware 170 information useful to define a viewpoint, modify the viewpoint or the like. In some cases, Tool 110 may be receptive to update requests issued by Middleware 170 to update its knowledge base (e.g. 140). In another embodiment, a tool, such as 110, may not be aware of the existence of Middleware 170. The tool may update its knowledge base (e.g., 140) and Middleware 170 may intercept the requests to the knowledge base. In some exemplary embodiments, Middleware 170 may block the requests from reaching the knowledge base. Additionally or alternatively, Middleware 170 may allow some requests to reach and be processed by the knowledge base.

In some exemplary embodiments, a Viewpoints Database 180 may be configured to store viewpoints that Middleware 170 obtains from designing tools, such as Tool 1 110. Additionally or alternatively, Viewpoints Database 180 may retain an aggregated viewpoint that incorporates instances, properties, classes or combination thereof from different designing tools.

In one exemplary scenario, Tool 1 110, may update Knowledge Base 140. In response to the update, Middleware 170 may receive an updated first viewpoint from Tool 1 110 and update the third viewpoint. The updated first and third viewpoints may be stored in Viewpoints Database 180. Additionally or alternatively, Middleware 170 may update Knowledge Base 150 based on the updated third viewpoint.

In some exemplary embodiments, Tool 1 110 may perform a query on Knowledge Base 140. Middleware 180 may intercept the query and provide a response to the query based on the first and third viewpoints, based on the aggregated viewpoint, or the like.

Figure 2A:
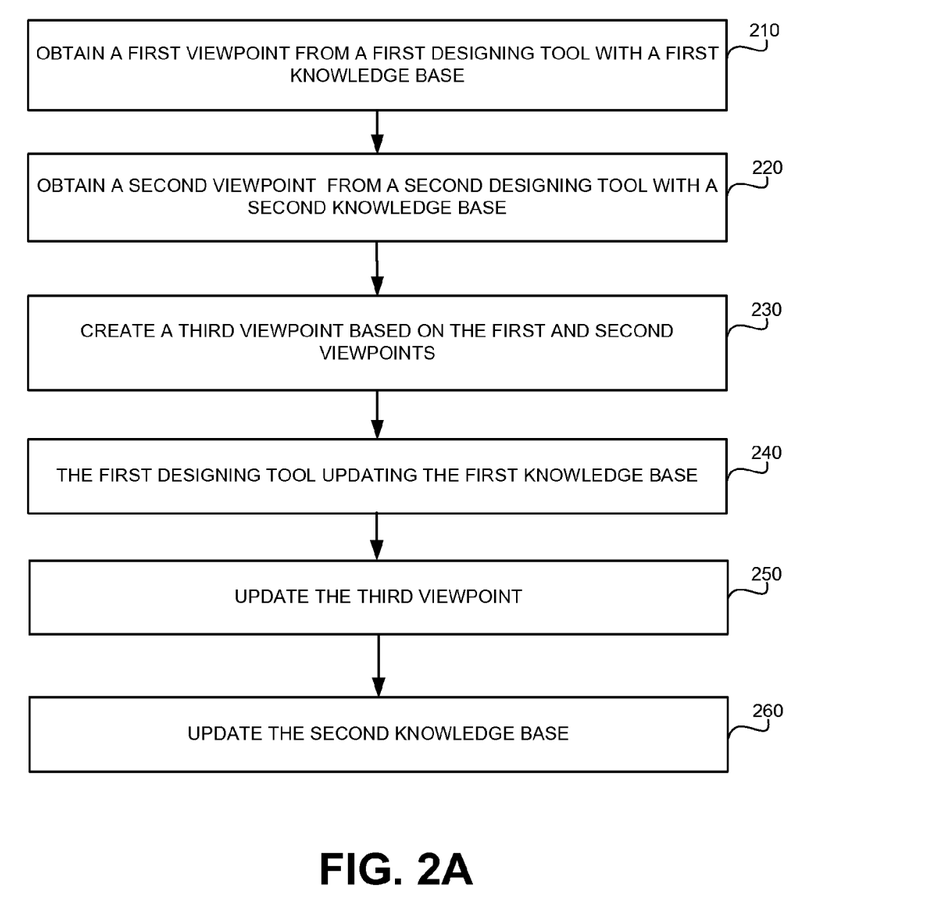
FIGS. 2A and 2B show flowchart diagrams of methods, in accordance with some exemplary embodiments of the disclosed subject matter.

Referring now to FIG. 2A showing a flowchart diagram of a method in accordance with some exemplary embodiments of the disclosed subject matter.

In Step 210, a first viewpoint may be obtained from a first designing tool. The first designing tool may have a first knowledge base. The viewpoint may be explicitly provided by the first designing tool or implicitly obtained therefrom, such as by monitoring the knowledge base, intercepting requests to the knowledge base, or the like. The first viewpoint may be obtained from a viewpoints database, such as 180 of FIG. 1.

Similarly, In Step 220, a second viewpoint may be obtained from a second designing tool. The second designing tool may have a second knowledge base. The second viewpoint may be obtained from a viewpoints database, such as 180 of FIG. 1.

In some exemplary embodiments the first and the second viewpoints may be partial depictions of a same system. The first and the second designing tools may be involved in the design process of the system. The first and second designing tool may be modeling tools which may be used by a same user or by different users.

In some exemplary embodiments, each viewpoint may be denoted in a form constituting three portions: an instance base, a property base, and a class base. An instance may be a partial representation of some properties that may be known about individual elements of the system (e.g., a component or a device) or phenomena in the system (e.g., an object or an event), or the like. Two instances that are specified either in the same or in different viewpoints may refer either to the same or to different elements in the system. In some exemplary embodiments, the class base may be a set of all classes known in the viewpoint. Each class is described by a set of properties that are known in the viewpoint. This set is split between a 'base' subset which constitutes a core set of properties that an instance identity may be determined by, and a complementary 'derived' subset demoting a set of properties whose possession may be inferred provided the base part of properties is known for any instance of this class.

Additionally or alternatively, an instance equality relation may be defined with respect to the base properties of a given class. Two instances may be considered equal in one class and distinct in another. Designated instance IDs may not therefore be necessary, although they may be used in an implementation. The property base may comprise all the properties known in the viewpoint. Additionally or alternatively, the property base may comprise a set of relations over the properties that are known in the viewpoint. As an example, the relations may include inducement relations which induce a first property based on a second property. The induced property may be a property of a same instance as the inducing property. Additionally or alternatively, the inducement relation may be based on several inducing properties and may provide several induced properties. In some exemplary embodiments, the system may be assumed to be open, so not all properties are known. Additionally or alternatively, in case an instance is not specified to have a property, the instance may still possess the property. In some exemplary embodiments, an instance may be defined as having a lack of possession of a property, such definition may indicate that the instance necessarily does not possess the property. Each given property p may be attributed to any instance either positively or negatively. A positive attribution may indicate that the instance possesses the property; a negative attribution may mean the instance does not possess the property (dispossession).

In some exemplary embodiments, the class base may define classes and their properties. Relationships between classes may be inferred from relationships between their defining properties. For example, class B may be inferred as a subclass of class A if the properties of class B imply the properties of class A. In other words, any property possessed by every element of class A may also be a property in the definition of class B. In some exemplary embodiments, various relationships may be defined between properties. A basic relationship type may be a possession precedence, denoted as $p_1 \leftarrow p_2$. The possession precedence may mean that for any instances possessing $p_2$, the possession of $p_1$ may be inferred. The total set of properties considered to be possessed by an instance may consist of all properties explicitly specified for the instance as well as any property that can be inferred from all applicable property relationships An example of a viewpoint may be the following viewpoint which may be named "technical viewpoint":
Instance-Base:
instance(techid(1S), input(temperature), output(signal)).
instance(techid(2S), input(pressure), output(signal)).
instance(techid(3C), input(pressure), action(latch)).
Class-Base:
class(Sensor, B={input(*), output(*)}, D={input(*), output(*)}).
class(Controler, B={input(*), action(*)}, D={input(*), action(*)}).
Property-Base:
Properties: input(temperature), input(pres sure), output (signal), action(latch).
Relationships: input(*)←input(X), output(*)←output(X), action(*)←action(X).

In the technical viewpoint, the instance base includes the specification of three logical system components: temperature sensor, pressure sensor, and pressure controller. Each component is specified by its relevant properties (i.e., techid, input, output, and action). The class base comprises the specification of two classes: sensor and controller. The property base comprises all properties being conceptually meaningful within the illustrated viewpoint, and any property relationships of interest in the viewpoint. An instance may be inferred to be of a specific class based on the properties it possesses. The first and second instances are inferred to be members of class "Sensor", as they include both an input(*) property (e.g., input(temperature) in the first instance, and input(pressure) in the second instance), and an output(*) property.

In case an instance possesses properties that match a definition of a class, it may be considered as instance member of that class. Some instances may be considered as members of several classes.

The property base in the technical viewpoint comprises a set of relationships. The set of relationships comprises three relationships over the properties: input(*)←input(X), output (*)←output(X) and action(*)←action(X). X denotes a variable in the logic language that is employed to collectively represent all concrete properties specified by the 'action' predicate. The relationship input(*)←input(X) implies that if any of the specific properties input(temperature) or input (pressure), then the generic property input(*) is possessed. Similarly, output(*)←output(X) and action(*)←action(X) imply that the generic properties are possessed if any of the specific properties are possessed respectively.

In Step 230, a third viewpoint may be created based on the first and the second viewpoints. The third viewpoint may be configured to provide a more holistic view of the system which is partially depicted by the first and the second viewpoints. The property base of the third viewpoint may comprise a union of the property base of the first view point and the property base of the second viewpoint, a union of properties of the first viewpoint and the properties of the second viewpoint, a union of the property relationships of the first viewpoint and the property relationships of the second viewpoint, or the like. The instance base of the third viewpoint may comprise a union of the instance base of the first viewpoint and the instance base of the second viewpoint. The class base of the third viewpoint may comprise a union of the class base of the first viewpoint and the class base of the second viewpoint.

In some exemplary embodiments, the third viewpoint may be a viewpoint that is created based on a definition of a first viewpoint and based on import instructions that import elements from the second viewpoint, such as importing instances, properties, classes, or the like.

Additionally or alternatively, instances, properties, or classes of each viewpoint may be referred to using unique namespaces to avoid collision of a same name that is used in both viewpoints. In some cases, property relations may be defined to infer a property from one viewpoint to a property of another viewpoint.

The import definitions, the instances, classes, properties, property relations definitions, or the like may be manually defined by a user (e.g. an integrating user controlling middleware 170 of FIG. 1), may be automatically defined, such as based on a template, may be defined based on commands received from designing tools, such as using dedicated API, or the like).

The third viewpoint may be retained in a viewpoints database, such as 180 of FIG. 1. The third viewpoint may or may not be retained independently of the first and second viewpoints.

In Step 240, the first designing tool may update the first knowledge base. The update may be initiated using an update query. As a non-limiting example the update query may be an update SQL query, an insert SQL query, a delete SQL query, or the like. The update query may add, remove or modify an instance; may add, remove or modify a property; may modify possessions of properties by an instance; may add, remove or modify a class; may add, remove or modify property relations, or the like.

In some exemplary embodiments, the update query may be processed by the first knowledge base and may cause it to be modified as instructed.

In Step 250, the third viewpoint may be updated in response to the first knowledge base being updated. The effect of the update query in the first knowledge base may entail an update on the first viewpoint which may be propagated to affect the third viewpoint, and then the second viewpoint, accordingly.

In Step 260, the second knowledge base may be updated based on updating the third viewpoint. In some cases, the update of the third viewpoint may be propagated to the second viewpoint and accordingly the second knowledge base may be updated. As an example, the update query in the first knowledge base, which may update the first viewpoint, may affect an instance that is also included in the second viewpoint. Therefore, the update may be reflected in the second viewpoint as well. In some exemplary embodiments, the disclosed subject matter may reflect the modification immediately without using a third, aggregated, viewpoint. As one example, in case of a deleted instance, the instance may be deleted from the second knowledge base as well. As another example, in case of a modification of possessed properties by an instance, the modification may be reflected in the second knowledge base as well. In some exemplary embodiments, a property relation defined for the second viewpoint may be invoked to define addition or alternative property possession based on the modification. Such modifications may be reflected in the second knowledge base.

Figure 2B:
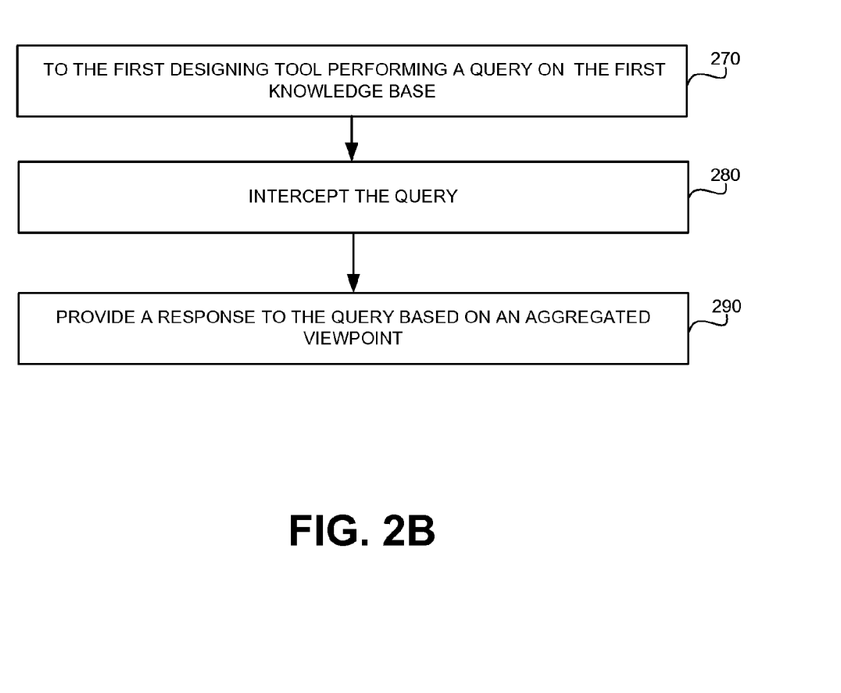

It will be noted that in FIG. 2A, the first and second knowledge base may be maintained up-to-date via a computerized device in accordance with the disclosed subject matter, such as a semantic middleware, so that with each modification in one tool, the knowledge base of the other tool is modified accordingly. In some exemplary embodiments, the disclosed subject matter may be employed with more than two tools, so that with each modification by one tool, the other knowledge bases of the other tools are modified accordingly. In such an embodiment, each tool may continue to operate by relying on its own knowledge base to show the model and to respond to retrieval queries Referring now to FIG. 2B showing a flowchart diagram of a method in accordance with some exemplary embodiments of the disclosed subject matter.

In Step 270, the first designing tool may perform a query on the first knowledge base. The query may be an update query, a retrieval query, or the like. As an example, the query may be "select*from SENSORS" in which all instances that are of class sensors are obtained.

In Step 280, the query may be intercepted. The query may be intercepted before reaching the first knowledge base so as to cause the first knowledge base not to receive and process the query. The query may be intercepted by a middleware, such as 170 of FIG. 1. The query may be intercepted by a component that is installed on the medium that is used to pass the queries from the tool to the knowledge base, such as on the wire, as an intermediate node in wireless communication, on a BUS in a computerized device, or the like. In some exemplary embodiments, the interception may be performed in software and not in hardware, such as using functionality of an Operating System (OS), or the like. The query may be intercepted and processed based on an aggregated viewpoint, such as the third viewpoint of FIG. 2A.

In Step 290, a response may be provided to the query based on an aggregated viewpoint, which may include instances, properties, classes, and the like, originated in other viewpoints. The query may be processed based on the aggregated viewpoint, such as to provide a response that is based not solely on the knowledge base of the querying tool, but rather on an aggregated, holistic, knowledge base of the system as gleaned from various different partial viewpoints.

Figure 3A:
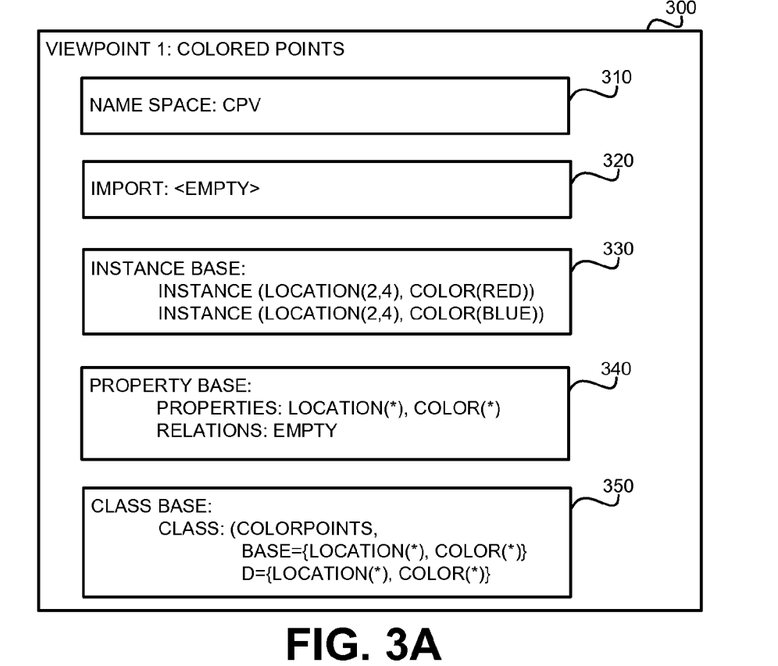
FIGS. 3A and 3B show illustrations of viewpoints, in accordance with some exemplary embodiments of the disclosed subject matter.
Figure 3B:
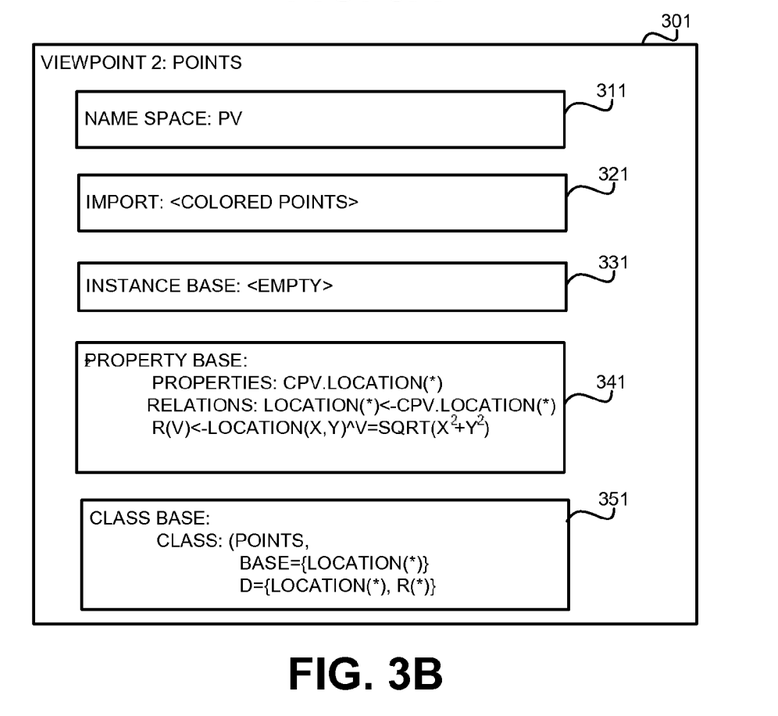

Referring now to FIGS. 3A and 3B showing illustrations of viewpoints, in accordance with some exemplary embodiments of the disclosed subject matter.

Viewpoint1 300 may represent colored points. In some exemplary embodiments, the colored points may a part of a system comprising the colored points and more elements. Additionally or alternatively, other viewpoints may represent other parts of the system. In some exemplary embodiments, the viewpoints may be interrelated. An element may appear in one or more viewpoints representing the system. As an example, Viewpoint2 301 may represent points in a same system as Viewpoint1 300.

In some exemplary embodiments, each viewpoint may have a unique namespace, such as Namespace 310 of Viewpoint1 300. In some exemplary embodiments, the unique namespace may ensure that each element of the namespace may be uniquely identified. For Namespace 310 of Viewpoint1 300 may be CPV (Colored Points Viewpoint), while Namespace 311 of Viewpoint2 301 may be PV (Points Viewpoint). The unique namespace may designate a unique name for the elements of the viewpoint, i.e. two different elements specified in different viewpoints may share a similar internal name, but may be distinguished according to the namespace of the corresponding viewpoint. As an example, both Viewpoint1 300 and Viewpoint2 301 may comprise a property named "location". Using the unique namespaces, the different properties may be uniquely referred to, such as CPV.location or PV.location.

In some exemplary embodiments, each viewpoint may comprise an import section. The import section may include a subset of elements represented by other viewpoints in the system. The subset of imported elements may be specified by one or more import statements.

In some exemplary embodiments, the import section may comprise a set element inclusion statements. An element inclusion statement may be imported from other viewpoint. An element inclusion statement may define a subset or a combination of instances specified in one or more other viewpoints that may be considered as part of the viewpoint's instance base, a subset of properties specified in one or more other viewpoints that may be considered as part of the viewpoint's property base, a subset of property rules specified in one or more other viewpoints that may be considered as part of the viewpoint's property base, or a subset of a classification specified in one or more other viewpoints that may be considered as part of the viewpoint's class base.

In some exemplary embodiments, a data manipulation language (e.g., SQL) of arbitrary expressive power may be used for the specification of inclusion statements.

The data manipulation language may be sufficiently expressive to express the different element inclusion statements.

The import section of Viewpoint 1 300, Import 320, comprises an empty set. The meaning of the empty set may be that Viewpoint1 200 may not comprise elements from other viewpoints.

The import section of Viewpoint2 301, Import 321, comprises a set of colored points. The meaning of the set may be that Viewpoint2 301 may import all elements from Colored Points Viewpoint, Viewpoint1 300. It will be noted that the viewpoint after applying the imported statements may be considered as an aggregated viewpoint (e.g., an aggregation of the viewpoint without the imported portions and of the portions of the other viewpoints that are imported into the viewpoint).

In some exemplary embodiments, each viewpoint may comprise an instance base. In some exemplary embodiments, the instance base may be a specification of all instances, such as individual modeling elements, that are acknowledged to exist in the part of the system represented in the viewpoint. The instances may be specified either explicitly by their possessed properties or implicitly being imported as some combination of instances that are specified in other viewpoints. In some exemplary embodiments, an instance may be specified as a subset of the properties in the property base.

The instance base of Viewpoint1 300, Instance Base 330, comprises two instances: Instance (Location(2,4),Color (red)) referring to an instance possessing two properties: Location(2,4) and Color(red), and Instance (Location(2,4), Color(blue)) referring to an instance possessing two properties: Location(2,4) and Color(blue). Instances in Instance Base 330 may be specified as possessing properties that are defined in Property Base 340. In Viewpoint1 300, Location (2,4) is a property that is preceded by the generic Location (*) property, while Color(red) is a property preceded by the generic Color(*) property.

The instance base of Viewpoint2 301, Instance Base 331, comprises an empty set hence Viewpoint2 301 does not specific instances locally. However, Viewpoint2 301 may acknowledge the existence of instances imported to the viewpoint. In some exemplary embodiments, Import 321 which indicates that Viewpoint1 300 is imported into Viewpoint2 301 may indicate that the instance base of the Viewpoint2 301 may include a union of all instances specified in Instance Bases 330 and 331.

In some exemplary embodiments, each viewpoint may comprise a property base. The property base may comprise a specification of a set of properties of the viewpoint and a specification of a set of property relationships in the viewpoint. In some exemplary embodiments, the properties may be traits of the elements of the system that may be assigned to one or more instance in the viewpoint. The properties can be of different types such as: a generic property type, a specific property type, a reference to other instances, or the like.

In some exemplary embodiments, the generic property type may have a form of p or p(*). p may be a property name, typically denoting class-level properties, for example, address(*) may denote a general property of having an address.

In some exemplary embodiments, the specific property type may have a form of p(v). p may be a property name and v may be a value. Specific properties may be typically used to denote instance level properties.

In some exemplary embodiments, the reference to other instances type may have a form of $p(p_s, [rp], [isMutual])$. $p_s$ may be a set of properties possessed by each of its linked instances. In some exemplary embodiments, $p_s$ may be replaced by an asterisk to indicate a generic association (e.g., marriedTo(*)). Each reference property may specify rp as a reversed property (i.e., a reference property possessed by a related instance) as in the case of a non-symmetric relationship (e.g., father_of vs. son_of). In some exemplary embodiments, isMutual flag may be used as an indication for a symmetric property (e.g., is_friend_of).

In some exemplary embodiments, the property relationships may comprise a set of rules associating between the properties from the property set. In some exemplary embodiments, a logical language may be employed to specify the property relationships.

In some exemplary embodiments, the property relationships may be possession precedence relationships. The possession precedence relationships may be denoted as $p_1 \leftarrow p_2$. A possession precedence relationship may imply that for a given instance i, if it possesses property $p_2$ then a possession of $p_1$ may also be inferred.

In some exemplary embodiments, the property relationships may be functional possession precedences. A functional possession precedence may be denoted, for example, as $p1(v_1) \leftarrow p_2(v_2)^\wedge v_1 = f(v_2)$. The functional possession precedence may imply that for any instance i, if it possesses the specific property $p_2(v_2)$, and $v_1$ is a function of $v_2$, then the possession of the specific property $p_1(v_1)$ may be inferred.

The property base of Viewpoint1 300, Property Base 340, comprises a set of properties: Location(*) and Color (*), denoting general properties of having a location and a color. The indication of a generic property in the property base may implicitly mean also the inclusion of any of its specific forms in the same viewpoint as specified in property relations.

The property base of Viewpoint2 301, Property Base 341, comprises a set of properties, comprising CPV.Location(*), denoting the general property of having a location, imported from Viewpoint1 300 (CPV), and a set of property relationships comprising the following two relationships: Location (*)→CPV.Location(*), assigning the generic location property from elements of Viewpoint1 200, to be preceded by the generic location property of the current viewpoint Viewpoint2 301, and $R(V) \rightarrow Location(X,Y)^\wedge V=sqrt(X^2+Y^2)$, assigning a property of radius to be derived from the location property comprising coordinates of the point, as the square root of the sum of square of the coordinates of the points (where X, Y and V are variables).

In some exemplary embodiments, each viewpoint may comprise a class base. The class base may comprise a specification of the various classifications of modeling elements (i.e. classes) in each viewpoint in terms of the properties that may be shared by their members. In some exemplary embodiments, the class base may be a specification of a set of classes. Each class may be specified using some of the properties in the property base. A class may be specified by two sets of properties: a set of base properties and a set of derived properties. In some exemplary embodiments, the set of base properties may be a specification of a core set of properties that are sufficient to determine instance equality. Instance equality may be determined based on two instances having the same base properties. In some exemplary embodiments, a property may be in p(*) form. In this case, the two instances must possess the property with the same value to be considered as equal. In some exemplary embodiments, the set of derived properties may comprise properties that may be possessed by all class members. An instance in the instance base may be a member of the class base if the instance has all class properties. Additionally or alternatively, the instance is a member of the class if it possesses all the base properties.

The class base of Viewpoint1 300, Class Base 350, comprises a class named ColorPoints. The class is specified with two base generic properties Location(*) and Color(*), and a set of derived properties containing the same properties.

The class base of Viewpoint2 301, Class Base 351, comprises a class named Points. The class is specified with a base generic property Location(*), and a set of derived properties containing the generic property Location(*), and the property of having a radius property R(V).

In some exemplary embodiments, a retrieval query of "select*from ColoredPoints" may be processed and return two instances: instance(Location(2,4), Color(red)), instance (Location(2,4), Color(red)). A retrieval query of "select*from Points" may be processed and return a single instance: instance(Location(2,4), R(4.47)) as the class Points is defined to only hold the location and the radius property. In some exemplary embodiments, the query may relate to several classes and may relate to specific properties, such as "select color from ColoredPoints".

An Embodiment

The design-space schema S of a semantic middleware system may be specified as a set of interrelated viewpoints. Each viewpoint v∈S may be a tuple v=<name,NS,Vps,PB,IB,CB>. Name may be a unique viewpoint name in S, NS may designate a unique namespace for all elements specified in v, Vps may specify a subset of the viewpoints in S that have been imported to v, PB may specify a property base in v, IB may specify an instance base in v, and CB may specify a class base in v.

None of the above viewpoint components is mandatory in the specification of a viewpoint.

Different types of viewpoints may be represented based on their components. One type of viewpoints may be a provider viewpoint. The provider viewpoint may specify instances. Correspondingly, a provider can define properties and classes. From a more philosophical perspective, providers may determine the existence of individual elements such that any specification of an instance by a provider entails the existence of a corresponding individual in the design space. Another type of viewpoints may be a view viewpoint. A view may define properties and classes, but may not specify instances. As a result, a view cannot export any instances, but may use instances from other viewpoints. Yet another type of viewpoints may be a mediator viewpoint. A mediator may import two or more viewpoints and may define property relationship in the logic L.

In some exemplary embodiments, the specified model may be employed to represent an engineered system's design space as its target domain of discourse. An ontological domain may be represented as a tuple $\Delta=<I,P,T,S,E>$. I may be a non-empty set of substantial individuals. P may be a non-empty set of substantial properties. T may be a non-empty set of concrete objects. A concrete object t∈T may be a mapping between each substantial individual x∈I and its properties $p(x) \subseteq P$, denoted $t=\langle x,p(x)\rangle$. S may be a set of all possible states the concrete objects in the domain may be at. E may be a corresponding set of events (i.e., state transitions) of all concrete objects in the domain.

In some exemplary embodiments, an interpretation I of a schema S may a pair <Δ,φ>. Δ may be an ontological domain and φ may be a meaning assignment (e.g., semantics) for the symbols (e.g., model constructs) of schema S. The application of the meaning assignment φ to a symbol M of S may be denoted φ(M). Each substantial individual in the design space may be described from various perspectives, each being focused on a subset of its features. Correspondingly, various possible interpretations a viewpoint might be adhering to, such as: instances as things, instances as states, instances as events, or the like.

In viewpoints that pertain to instances as things, the interpretation of an instance may be $i^I=t$. i may be a representation of a concrete object in the domain. Correspondingly, each property of the instance p∈p(i) may be interpreted as some representation of a concrete object substantial property $p^I=p|p\epsilon p(t)$. According to this interpretation, two different instance representations i,j may be considered identical if there exists a concrete object t∈T in the domain Δ such that both instances represent it, i.e., $i^I=j^I=t$. Consistent with these interpretations, the interpretation of a class $c^I=\{t\}$ may be a set of things whose membership in the class is determined by their properties as defined in the syntactic section.

In viewpoints that pertain to instances as states, the interpretation of an instance $i^I=s(t)$ where $s(t)=<x_1 \ldots x_n>\epsilon S$ may be a representation of a single state of a concrete object in the domain, specified by the values of a set of state variables such that $x_k=f_k(t)$ (i.e., a function of time). Similarly, such a representation may entail that each property of the instance p∈p(i) may be interpreted as a single state variable $p^I=x_i\epsilon s(t)$. According to this interpretation, two different instance representations i,j may be considered identical if there exists a substantial individual in the domain t such that both instances represent the same state from one of its possible states, i.e., $i^I j^I=s(t)$. Consistent with these interpretations, the interpretation of a class $c^I=\{<x_i \ldots x_j>\}$ may be a set of states whose membership in the class is determined by their state variables as defined in the syntactic section.

In viewpoints that pertain to instances as events, the interpretation of an instance $i^I=e(t)$ where $e(t)=<s_1(t),s_2(t)>\epsilon E$ may be a representation of a single event of a concrete object in the domain, specified as a pair of states. Similarly, such a representation may entail that each property of the instance p∈p(i) may be interpreted as some representation of a single state variable transition $t_k=<f_k(t_1),f_k(t_2)>$. According to this interpretation, two different instance representations i,j may be considered identical if there exists a substantial individual in the domain t such that both instances represent one of its possible events, e.g., $i^I=j^I=e(t)$. Consistent with these interpretations, the interpretation of a class $c^I=\{<t_i \ldots t_j>\}$ may be a set of events whose membership in the class is determined by their state variable transitions as defined in the syntactic section.

One embodiment can be used to demonstrate concrete instantiations to the disclosed subject matter, exemplifying its validity with respect to common engineering circumstances. In particular, it may demonstrate some usefulness of the disclosed subject matter as a means for modeling tool integration and as a platform that can facilitate holistic analysis, across viewpoints.

Referring again to the example above of the technical viewpoint, an additional viewpoint may be introduced: a catalog viewpoint Viewpoint name: catalog, Namespace: cat
Import: none
Instance Base:
instance(type(sensor), code(101-A), mintemp(−30C), maxtemp(150C), volt(1 mV), cost($4)).
instance(type(sensor), code(332-A), minpressure(0B), maxpressure(2B), cost($3)).
instance(type(controler), code(669-B), minpressure(0B), maxpressure(1B), pressureslots(2), cost($5)).
Property Base:
Properties: type(sensor), type(controler), code(101-A), code(332-A), code(669-B), mintemp(−30C), maxtemp(150C), volt(1 mV), cost($4), minpressure(0B), maxpressure(2B), cost($3), maxpressure(1B), pressureslots(2), cost($5).

The catalog viewpoint may hold off-the-shelf inventory information about system components. Specifically, its instance base includes catalog information for three instances that refer to the same system components in the technical viewpoint. Since the catalog viewpoint was created independently (e.g., by a different tool), the same three system elements were assigned different inventory codes as identifiers. Hence, there needs to be some "merge" of the two viewpoints to enable holistic reasoning over the unified set of properties associated with each system's element.

Such integration may easily be attained using a system in accordance with the disclosed subject matter. For example, one can specify a third "analysis" viewpoint:

Viewpoint name: analysis, Namespace: ana
Import: catalog, technical
Class Base:
class (costable-Item, B={techid(*)}, D={cost(*)})
Property Base:
Relationships: tch.techid(1S)←cat. code(101-A).
tch.techid(2S)←cat.code(332-A).
tch.techid(3C)←cat.code(669-B).
cost(*)←tch.techid(*).
cost(*)←cat.cost(X).

The analysis viewpoint imports from the catalog and technical viewpoints, hence it has all instances of both imported viewpoints as part of its own instance base.

A set of property relationships was specified as having the following consequences: each catalog instance is given a corresponding technical ID property, and all instances are also given the generic property cost(*). Consequentially, as illustrated in the definition of class costable-Item, it is possible to consider its individual members as any instance combination having the generic property cost(*), while also being distinctly unified according to their technical ID.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a processor of a computerized apparatus, the method comprising:

obtaining a first viewpoint representing a first partial depiction of a system, wherein the first viewpoint comprises a first property base comprising a specification of a set of properties used by the first viewpoint in depicting the system, a first instance base comprising a specification of a set of instances each of which depicting an element of the system by a subset of properties in the first property base, and a first class base comprising a specification of a set of classes each of which depicting a classification of elements of the system by a subset of properties in the first property base shared by instances in the first instance base depicting the elements;

obtaining a second viewpoint representing a second partial depiction of the system, wherein the second viewpoint comprises a second property base comprising a specification of a set of properties used by the second viewpoint in depicting the system, a second instance base comprising a specification of a set of instances each of which depicting an element of the system by a subset of properties in the second property base, and a second class base comprising a specification of a set of classes each of which depicting a classification of elements of the system by a subset of properties in the second property base shared by instances in the second instance base depicting the elements, wherein the first instance base comprises at least one instance not comprised in the second instance base;

creating a third viewpoint based on the first and second viewpoints, wherein the third viewpoint representing the system, wherein the third viewpoint comprises a third property base comprising a specification of a set of properties used by the third viewpoint in depicting the system, a third instance base comprising a specification of a set of instances each of which depicting an element of the system by a subset of properties in the third property base, and a third class base comprising a specification of a set of classes each of which depicting a classification of elements of the system by a subset of properties in the third property base shared by instances in the third instance base depicting the elements, wherein the third instance base comprises instances comprised by the first instance base and instances comprised by the second instance base.

2. The method of claim 1, wherein at least one of the first, second and third property bases further comprises a specification of a set of property relationships in the respective viewpoint.

3. The method of claim 1, wherein at least one of the first, second and third class bases comprises a specification of a core set of properties, wherein the core set of properties are used to uniquely identify an instance in a viewpoint by determining an equality relation between instances based thereon.

4. The method of claim 1, wherein the first viewpoint is obtained from a first designing tool having a first knowledge base depicting a first portion of the system, wherein the second viewpoint is obtained from a second designing tool having a second knowledge base depicting a second portion of the system.

5. The method of claim 4 further comprises: in response to the first designing tool updating the first knowledge base, receiving an updated first viewpoint and updating the third viewpoint.

6. The method of claim 5 further comprises: in response to said updating the third viewpoint, updating the second viewpoint based on the updated third viewpoint.

7. The method of claim 4 further comprising: in response to the first designing tool performing a query on the first knowledge base, intercepting the query and providing a response to the query based on the third viewpoint.

8. A computerized apparatus having a processor, the processor being adapted to perform the steps of:

obtaining a first viewpoint representing a first partial depiction of a system, wherein the first viewpoint comprises a first property base comprising a specification of a set of properties used by the first viewpoint in depicting the system, a first instance base specification of a set of instances each of which depicting an element of the system by a subset of properties in the first property base, and a first class base comprising a specification of a set of classes each of which depicting a classification of elements of the system by a subset of properties in the first property base shared by instances in the first instance base depicting the elements;

obtaining a second viewpoint representing a second partial depiction of the system, wherein the second viewpoint comprises a second property base comprising a specification of a set of properties used by the second viewpoint in depicting the system, a second instance base comprising a specification of a set of instances each of which depicting an element of the system by a subset of properties in the second property base, and a second class base comprising a specification of a set of classes each of which depicting a classification of elements of the system by a subset of properties in the second property base shared by instances in the second instance base depicting the elements, wherein the first instance base comprises at least one instance not comprised in the second instance base;

creating a third viewpoint based on the first and second viewpoints, wherein the third viewpoint representing the system, wherein the third viewpoint comprises a third property base comprising a specification of a set of properties used by the third viewpoint in depicting the system, a third instance base comprising a specification of a set of instances each of which depicting an element of the system by a subset of properties in the third property base, and a third class base comprising a specification of a set of classes each of which depicting a classification of elements of the system by a subset of properties in the third property base shared by instances in the third instance base depicting the elements, wherein the third instance base comprises instances comprised by the first instance base and instances comprised by the second instance base.

9. The computerized apparatus of claim 8, wherein at least one of the first, second and third property bases further comprises a specification of a set of property relationships in the respective viewpoint.

10. The computerized apparatus of claim 8, wherein at least one of the first, second and third class bases comprises a specification of a core set of properties, wherein the core set of properties are used to uniquely identify an instance in a viewpoint by determining an equality relation between instances based thereon.

11. The computerized apparatus of claim 8, wherein the first viewpoint is obtained from a first designing tool having a first knowledge base depicting a first portion of the system, wherein the second viewpoint is obtained from a second designing tool having a second knowledge base depicting a second portion of the system.

12. The computerized apparatus of claim 11, wherein the processor is further adapted to perform: in response to the first designing tool updating the first knowledge base, receiving an updated first viewpoint and updating the third viewpoint.

13. The computerized apparatus of claim 12, wherein the processor is further adapted to perform: in response to said updating the third viewpoint, updating the second viewpoint based on the updated third viewpoint.

14. The computerized apparatus of claim 11, wherein the processor is further adapted to perform: in response to the first designing tool performing a query on the first knowledge base, intercepting the query and providing a response to the query based on the third viewpoint.

15. A computer program product comprising a computer readable storage medium retaining program instructions, which program instructions when read by a processor, cause the processor to perform a method comprising:

obtaining a first viewpoint representing a first partial depiction of a system, wherein the first viewpoint comprises a first property base comprising a specification of a set of properties used by the first viewpoint in depicting the system, a first instance base comprising a specification of a set of instances each of which depicting an element of the system by a subset of properties in the first property base, and a first class base comprising a specification of a set of classes each of which depicting a classification of elements of the system by a subset of properties in the first property base shared by instances in the first instance base depicting the elements;

obtaining a second viewpoint representing a second partial depiction of the system, wherein the second viewpoint comprises a second property base comprising a specification of a set of properties used by the second viewpoint in depicting the system, a second instance base comprising a specification of a set of instances each of which depicting an element of the system by a subset of properties in the first property base, and a second class base comprising a specification of a set of classes each of which depicting a classification of elements of the system by a subset of properties in the first property base shared by instances in the first instance base depicting the elements, wherein the first instance base comprises at least one instance not comprised in the second instance base;

creating a third viewpoint based on the first and second viewpoints, wherein the third viewpoint representing the system, wherein the third viewpoint comprises a third property base comprising a specification of a set of properties used by the third viewpoint in depicting the system, a third instance base comprising a specification of a set of instances each of which depicting an element of the system by a subset of properties in the first property base, and a third class base comprising a specification of a set of classes each of which depicting a classification of elements of the system by a subset of properties in the first property base shared by instances in the first instance base depicting the elements, wherein the third instance base comprises instances comprised by the first instance base and instances comprised by the second instance base.

* * * * *